(12) United States Patent
Liedmeyer et al.

(10) Patent No.: US 7,850,222 B2
(45) Date of Patent: Dec. 14, 2010

(54) CABRIOLET VEHICLE

(75) Inventors: Petra Liedmeyer, Recke (DE); Uwe Willenborg, Osnabruck (DE); Norbert Bahlmann, Osnabruck (DE)

(73) Assignee: Wilhelm Karmann GmbH, Osnabruck (DE)

( * ) Notice: Subject to any disclaimer, the term of this patent is extended or adjusted under 35 U.S.C. 154(b) by 1090 days.

(21) Appl. No.: 10/596,247

(22) PCT Filed: Nov. 26, 2004

(86) PCT No.: PCT/DE2004/002627
§ 371 (c)(1),
(2), (4) Date: Oct. 20, 2006

(87) PCT Pub. No.: WO2005/056347
PCT Pub. Date: Jun. 23, 2005

(65) Prior Publication Data
US 2007/0164584 A1 Jul. 19, 2007

(30) Foreign Application Priority Data
Dec. 6, 2003 (DE) ................................. 103 57 100

(51) Int. Cl.
*B60R 21/04* (2006.01)
(52) U.S. Cl. .............................. 296/107.06; 296/187.13
(58) Field of Classification Search ............ 296/107.01, 296/121, 107.03, 107.06, 107.07, 187.05, 296/187.13, 214; 280/748; 292/DIG. 5
See application file for complete search history.

(56) References Cited

U.S. PATENT DOCUMENTS

| | | | | |
|---|---|---|---|---|
| 3,129,025 A | * | 4/1964 | Krueger | 292/97 |
| 6,601,906 B2 | * | 8/2003 | Deadrick et al. | 296/121 |
| 6,951,364 B2 | * | 10/2005 | Scholz et al. | 296/121 |
| 6,953,217 B2 | * | 10/2005 | Hasselgruber et al. | 296/121 |
| 6,988,767 B2 | * | 1/2006 | Schlachter et al. | 296/218 |
| 7,017,982 B2 | * | 3/2006 | Homann et al. | 296/218 |
| 7,240,952 B2 | * | 7/2007 | Gandemer et al. | 296/107.06 |
| 7,377,576 B2 | * | 5/2008 | Just | 296/121 |
| 7,407,201 B2 | * | 8/2008 | Pfertner et al. | 292/201 |
| 7,513,563 B2 | * | 4/2009 | Guillez et al. | 296/121 |

OTHER PUBLICATIONS

2001 Ford Mustang Convertible, a picture of a similar construction is found at http://www.carmax.com/enUS/view-car-gallery/default.html?sn=6139486&zip=22192.*

* cited by examiner

*Primary Examiner*—Glenn Dayoan
*Assistant Examiner*—Gregory Blankenship
(74) *Attorney, Agent, or Firm*—Quinn Law Group, PLLC

(57) ABSTRACT

A convertible vehicle with a roof, which includes, in the closed state, a section of a laterally running roof strut on an area directly or indirectly adjacent to the windshield frame that protrudes farther into the passenger compartment than roof areas lying behind it. The section, on a surface facing the passenger compartment, has at least one large-area recess, coverable by at least one deformable covering.

20 Claims, 6 Drawing Sheets

CABRIOLET VEHICLE

CROSS-REFERENCE TO RELATED APPLICATION(S)

This application is a US National Phase of International Application No. PCT/DE 2004/0002627, filed Nov. 26, 2004, which claims priority to German 103 57 100.0, filed Dec. 6, 2003. The entire contents of the above identified applications are incorporated herein by reference.

TECHNICAL FIELD

The invention relates to a convertible vehicle with at least one roof section protruding into the passenger compartment, according to the main concept of Claim 1, as well as an associated vehicle roof.

BACKGROUND OF THE INVENTION

Convertible vehicles are known that have a flexible roof cover secured to a metal roof frame, whereby the cover is stretched in the front area over a support cross-structure, often also referred to as a roof strut. Such a roof strut can consist, for example, of several individual supports or a die-cast structure, for example of a light metal alloy or a metal foam, with an upper and a lower shell. The roof strut, in addition to the stretching function, can also serve as a support for locking parts of the roof onto the windshield frame, and also operating elements for it, at least in semiautomatic roofs. In each case, this roof section extends farther downward into the passenger compartment than a subsequent roof surface and thereby constitutes a risk of impact during accidents, especially for large adult occupants. This applies especially to sports vehicles, such as two-seat roadsters, in which the windshield is very strongly sloped and the roof is low overall. Under such space conditions, it is therefore also particularly difficult to combine the smallest possible outside dimension of the roof strut with accommodation of locking elements.

The underlying problem of the invention is to improve safety in a convertible vehicle of the type mentioned.

SUMMARY OF THE INVENTION

The invention solves this problem with a convertible vehicle with the features of Claim 1 and by a moving vehicle roof with the features of Claim 11. In regard to other advantageous embodiments of the invention, Claims 2 through 10 are referred to.

Accident safety for the occupants is improved by the invention, since the roof section extending into the passenger compartment is designed flexibly at these sites because of deformability of the coverings, and is therefore free of sharpness. The cavity lying behind the coverings can permit extensive deformation during head impact.

If two recesses lying symmetrically to a vertical longitudinal center plane are provided instead of a continuous recess, the same safety can be created for the driver and passengers, and the stability of the roof strut is retained by a rigid area left in between in the center, which is also suitable for accommodating an optional manually operable locking and unlocking lever.

With a minimum width of the deformable coverings of twenty-five, advantageously more than thirty centimeters, a sufficiently large possible head-impact area can also be neutralized during an oblique collision.

If parts for locking the roof strut to the windshield frame, especially side safety catches, can be installed through the open recesses, the production of such a roof is simplified. In addition, the roof strut can be kept very small in its dimensions, since accessibility through the open recesses is facilitated and no large, permanent installation spaces need to be provided. Safety is further improved through this.

Additional advantages and features of the invention can be seen from a practical example of the object of the invention, shown schematically in the drawing, which is described below and can be changed.

DESCRIPTION OF THE PREFERRED EMBODIMENTS

Figure 1:
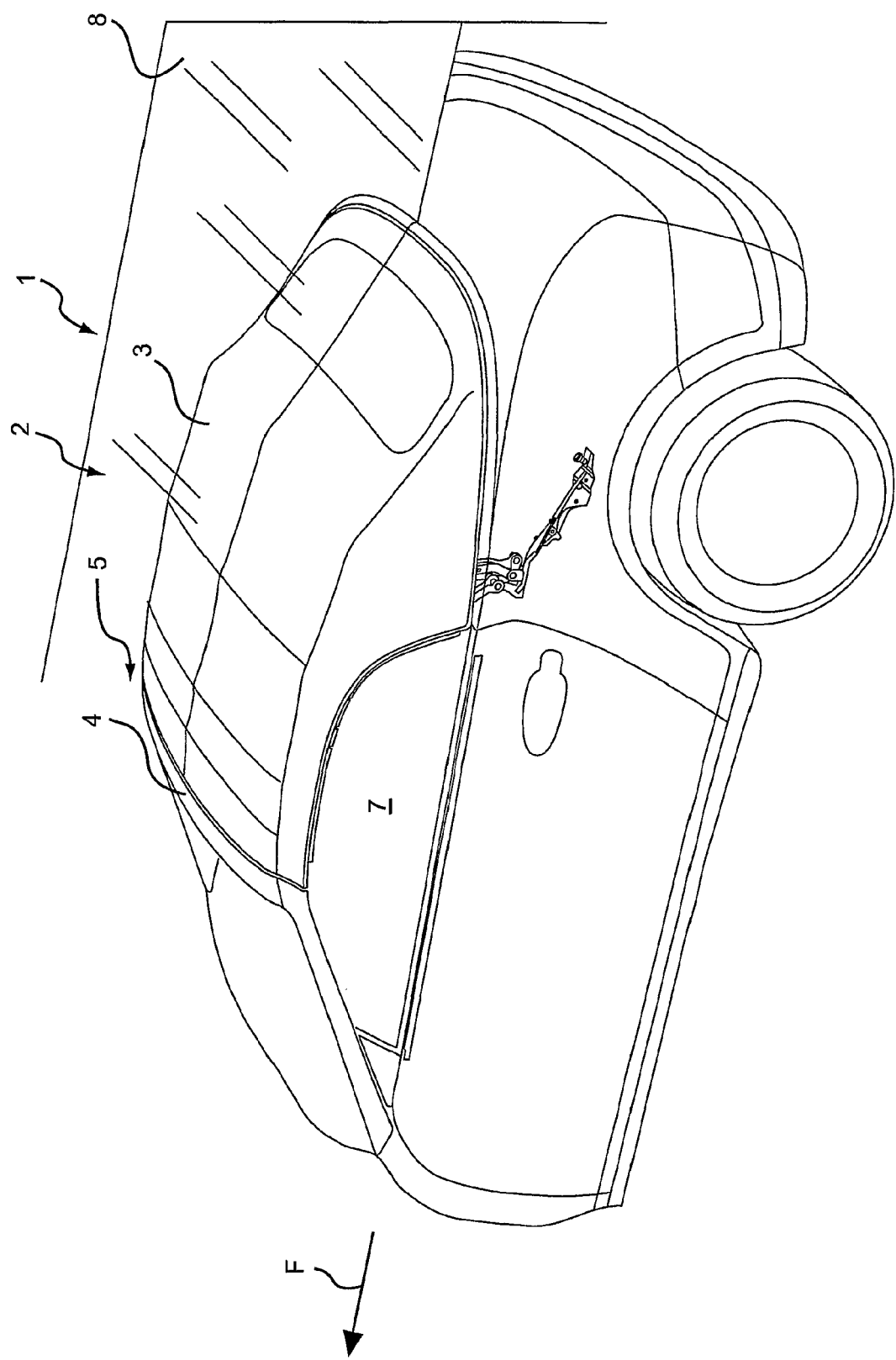
FIG. 1 shows a middle area of a convertible vehicle according to the invention in the a schematic, partially cut away perspective view, with a fully closed roof.
Figure 2:
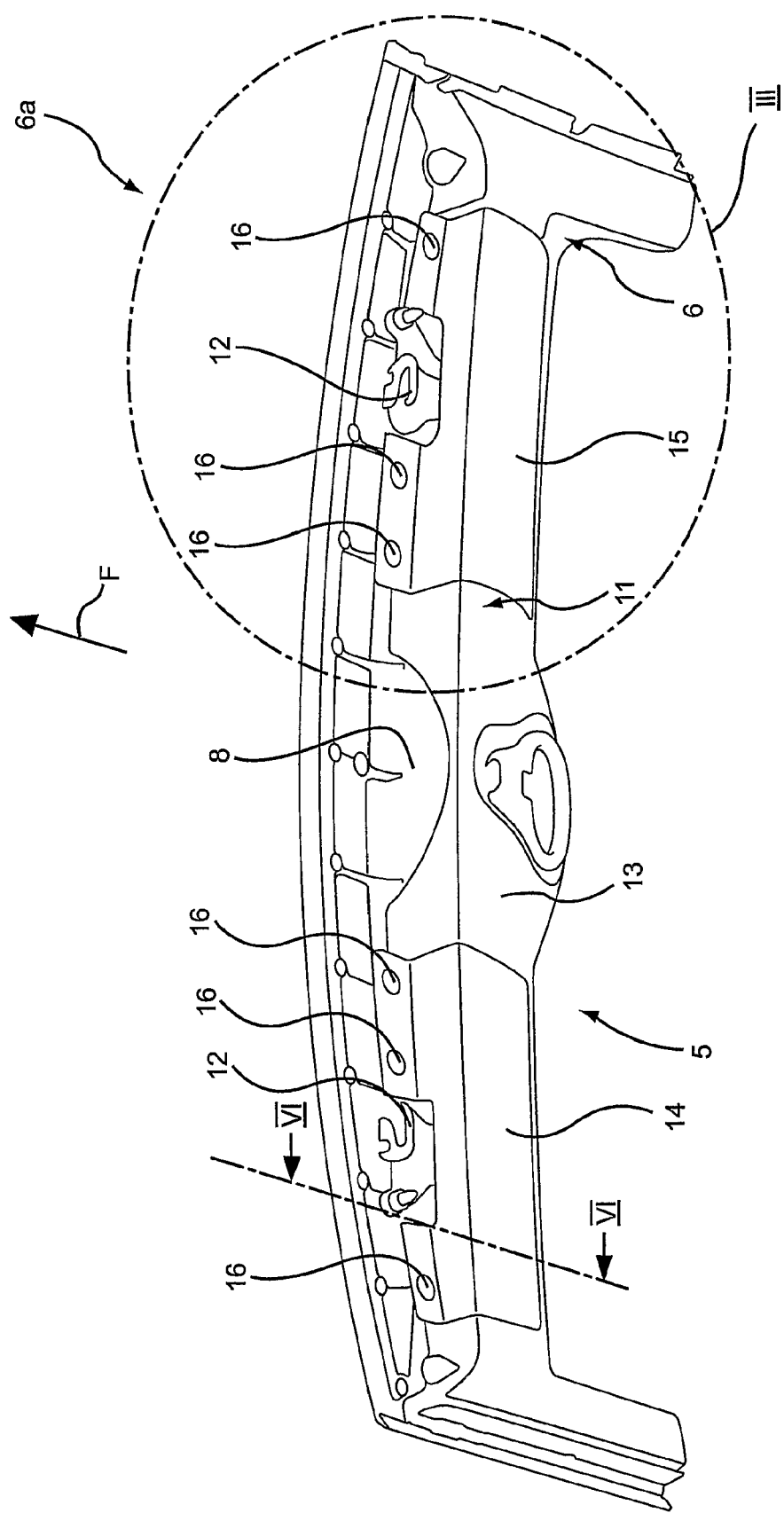
FIG. 2 shows a perspective, individual part view of the roof strut, viewed obliquely from the front, with two symmetric recesses and mounted coverings.
Figure 3:
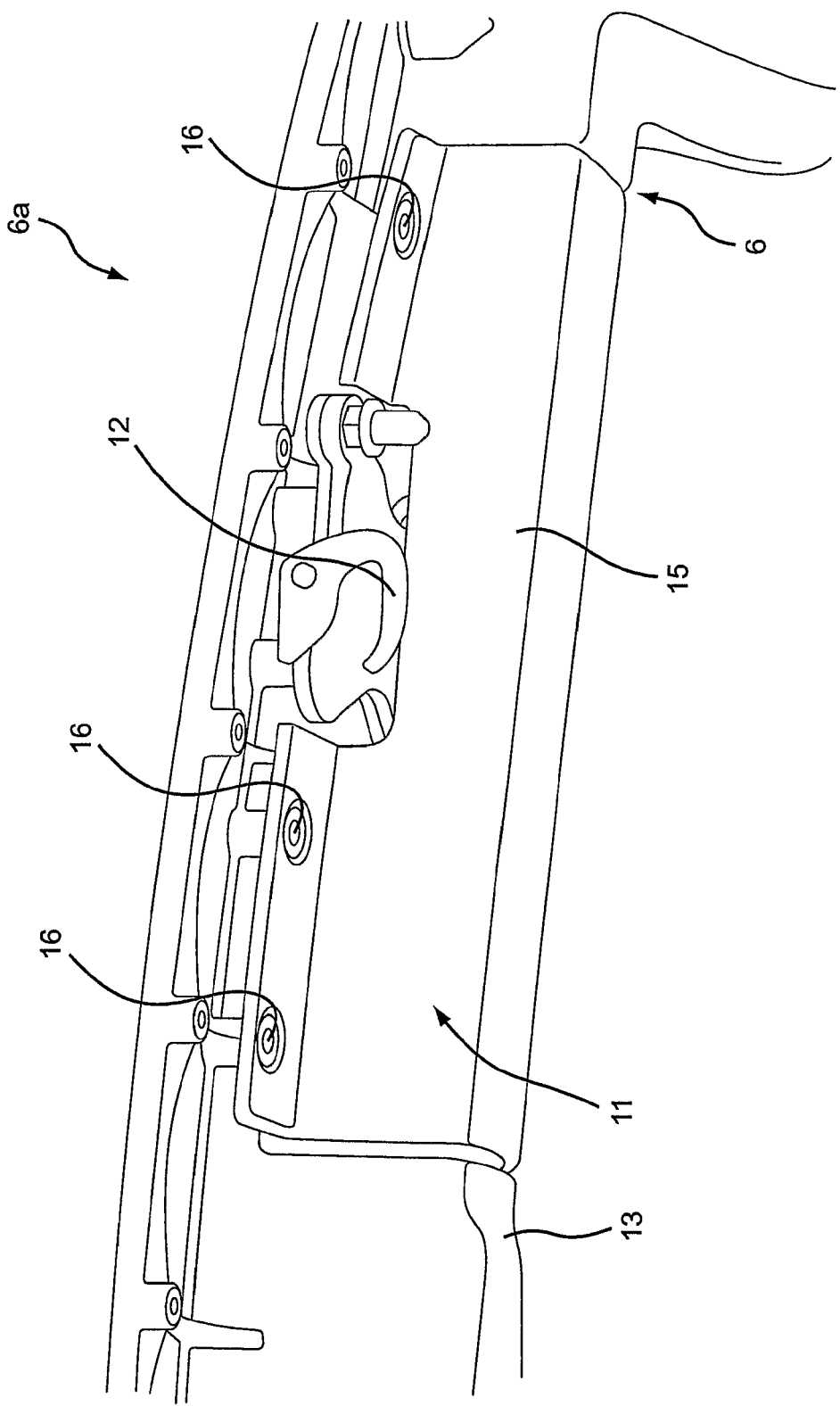
FIG. 3 shows detail III in FIG. 2.
Figure 4:
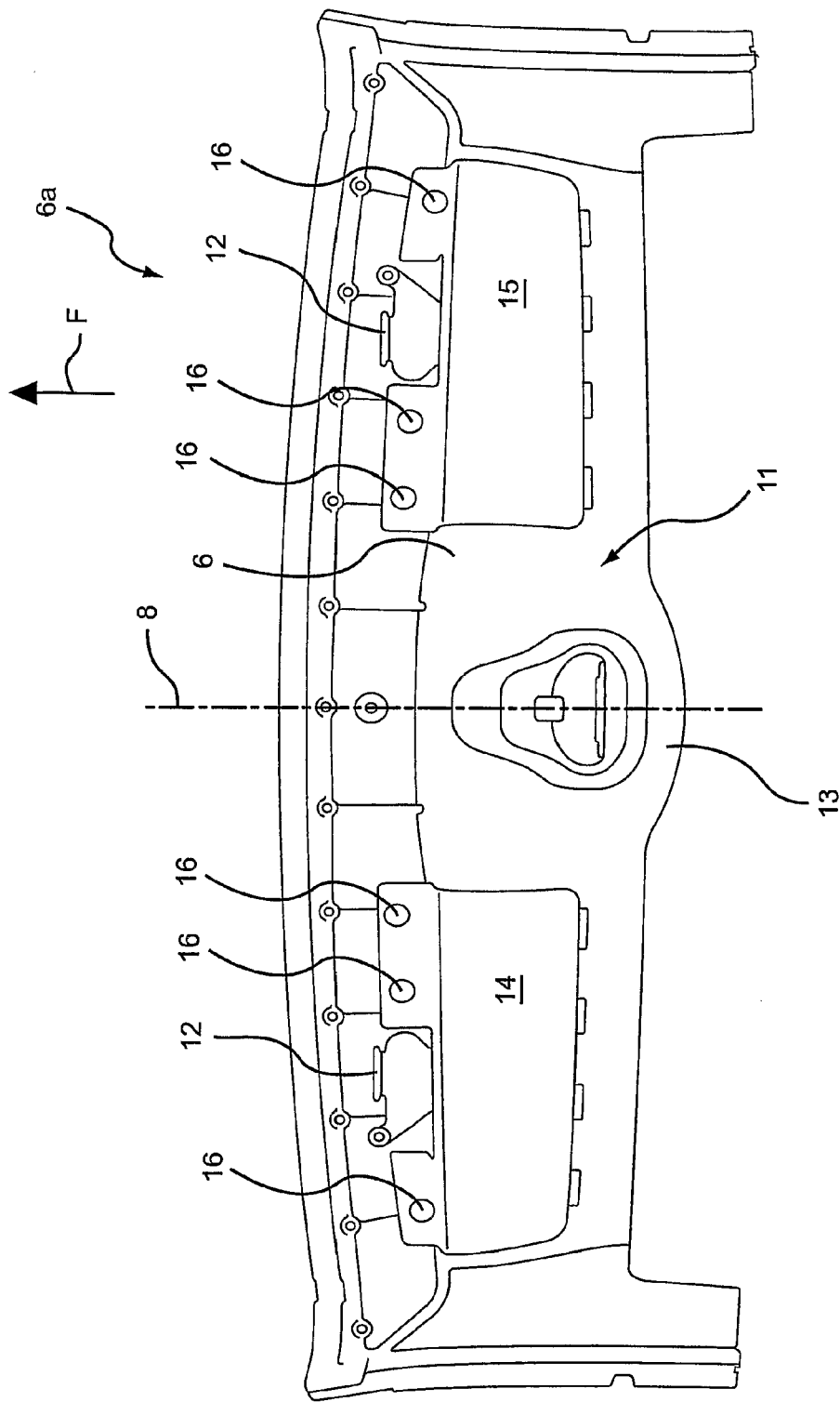
FIG. 4 shows the roof strut according to FIG. 2, seen from below.

The convertible vehicle 1, according to the invention, can also be a two-seater or else a convertible vehicle with a larger interior space and, for example, two rows of seats.

It includes a moving roof 2, which, in the practical example, has a flexible roof cover 3, which is not essential. In the practical example shown, the cover 3 extends over the entire moving roof 2, which can be locked in the closed state to a windshield frame 4. The invention is also applicable to a partially convertible vehicle, in addition to the full convertible vehicle shown, in which a roof part attached to the auto body is situated in the rear area of the vehicle and only the roof part lying in front of this is movable.

In both a continuous cover 3 and in roof bars designed to be partially rigid, a section 6 of the roof strut 6a is provided in the front area 5 of roof 2 in the direction of travel F, which extends farther into the passenger compartment than a roof surface lying behind it, which can be formed in the practical example by the inside of the cover 3 itself or an inner cover stretched beneath it.

The section 6 extending farther into the passenger compartment 7 is designed here as a component of a roof strut, generally manufactured as a die-cast structure. This has two recesses 9, 10, symmetric to a vertical longitudinal center plane 8, which are made in an inward-facing surface 11. The recesses 9, 10 are positioned in the center in front of the front seats, each has a width of at least 25 cm, and they can also be significantly wider, depending on the vehicle configuration. Instead of the two recesses 9, 10, an individual continuous recess (not shown) could also be provided.

The two recesses 9, 10 shown, however, make it possible for a rigid connection area 13 of the roof strut 6a to be left between them, which serves here as a support for a manual operating handle, with which lateral safety catches 12 of the roof 2 can be engaged with or disengaged from the windshield frame 4. A semiautomatic or fully manual roof operation, as can be desired in sports roadsters, therefore remains possible.

Figure 5:
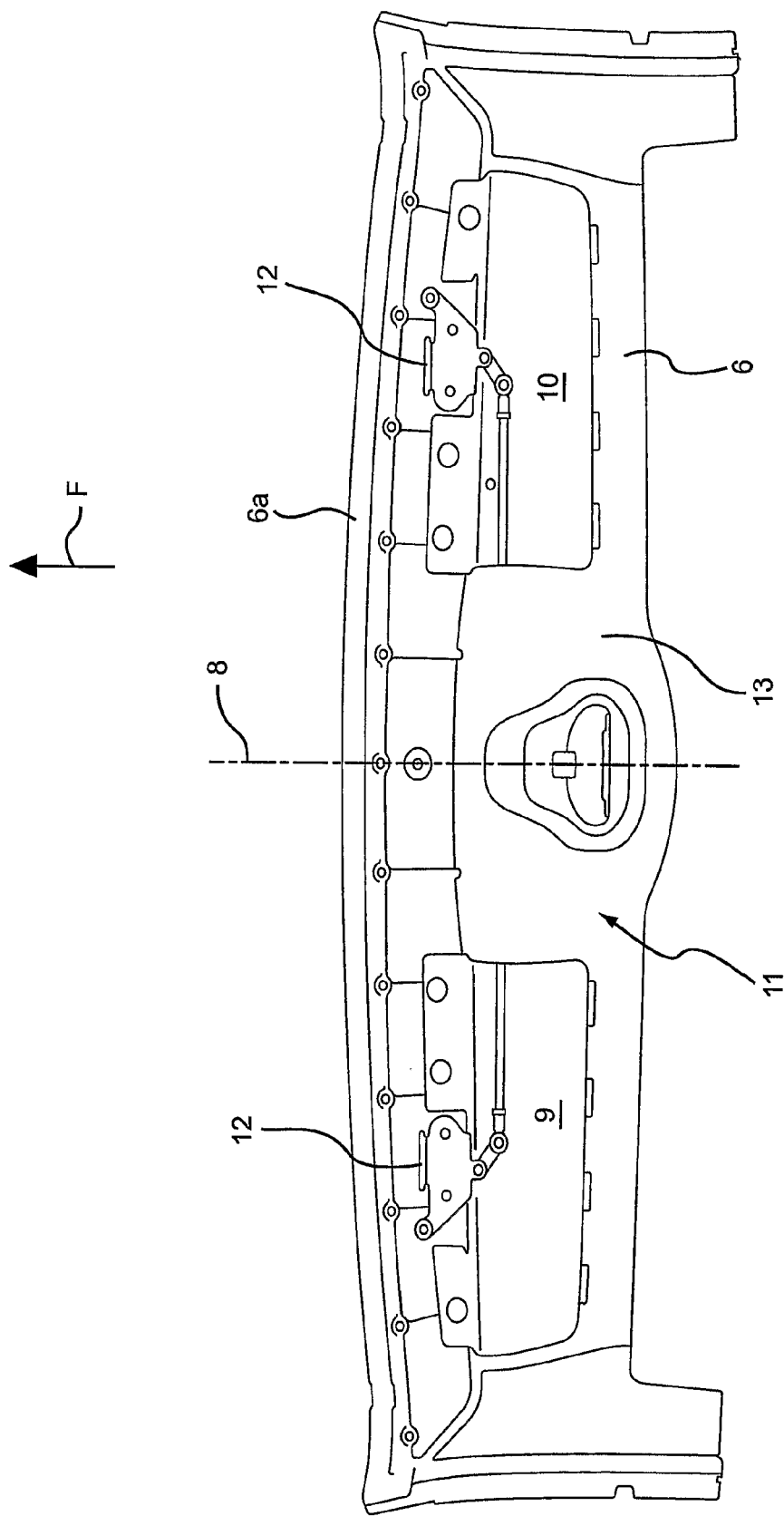
FIG. 5 shows a similar view to FIG. 4, before installation of the coverings.

It is shown in FIG. 5 that the recesses 9, 10 serve as an aid to installation: the lateral safety catches 12 are accessible through the opened recesses 9 and can be fastened, for example, screwed, to the roof strut 6a by manipulation through the recesses. The roof strut 6a can therefore be optimized to maximize the remaining head space and, despite the then limited dimensions, normally dimensioned safety catches 12 or similar fastening elements for its locking to the windshield frame 4 can be accommodated. The installation formed with recesses 9, 10 simultaneously produces a larger head space and therefore greater accident safety, because of the minimization of the roof strut 6.

The recesses 9, 10 can be spanned by coverings 14, 15, i.e., they can be almost or, especially, fully covered. In the installed state, the coverings 14, 15 are therefore visible from the passenger compartment 7; these can therefore be adapted advantageously in color to the passenger compartment 7 and made from textiles. Both plastics and thin metal sheets can be considered as materials for the coverings 14, 15. In each case, the coverings 14, 15, during any head impact by occupants, are deformable without causing head injuries. The coverings 14, 15 can be upholstered for this purpose, for example, also by foaming. During an impact, a person accelerated forward is braked by the coverings 14, 15, so that the airbags can function better.

In order to ensure that, during an accident, head impact will actually occur on the coverings 14, 15 and not on the remaining areas of the roof strut 6a, the covering should have significant size: at least 70 square centimeters, but advantageously a multiple of this is necessary for this purpose. In the practical example, each covering 14, 15 has a dimension of more than 30 centimeters wide and 20 centimeters deep.

During assembly, the coverings 14, 15 are screwed to the roof strut 6a with their ends arranged to the front in the direction of travel F, which coverings lie on the windshield frame 4 when the roof 2 is closed, so the screws 16 are not visible or accessible when roof 2 is closed and the screwheads therefore do not offer any increased risk of injury.

On their rear ends opposite the direction of travel 4, the coverings 14, 15 can be releasably suspended behind a protruding edge 17 of the section 6 of the roof strut 6a. In order to avoid a situation in which, during head impact, the coverings 14, 15 are raised from this edge and forced inward into recesses 9, 10, the edge 17 has a hold-down 18 for the coverings 14, 15 arranged in front of it. This holds the coverings 14, 15 in their secure position.

Figure 6:
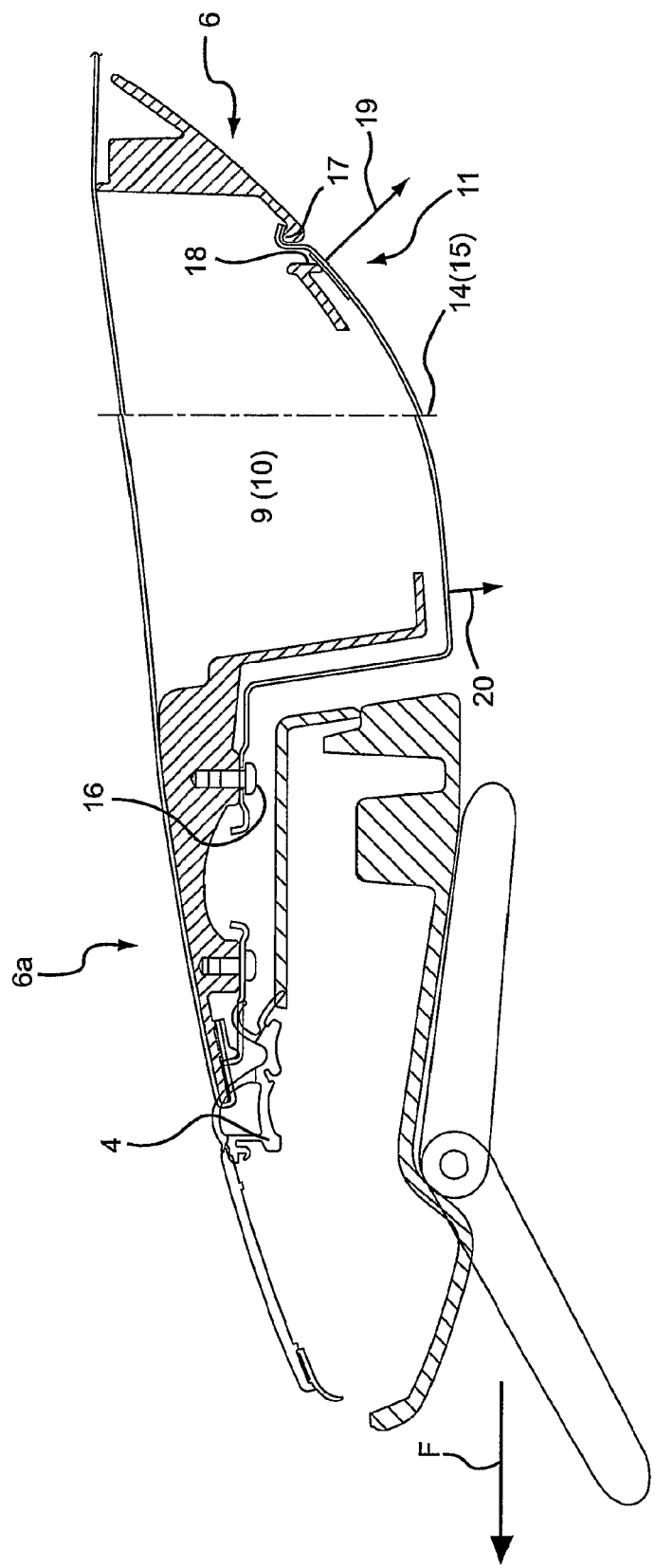
FIG. 6 shows a section along VI-VI in FIG. 2, with a closed roof with the roof strut lying on the windshield frame.

The recesses 14, 15 are arched, as can be seen in FIG. 6. In this case, a solder line 19 of the outer surfaces of the coverings 14, 15 has at least a rearward facing component and a solder line 20 has at least a downward facing component. Both head impact from the rear, which tends to occur in large persons, and head impact from below, as can occur in smaller persons, are therefore protected against.

While the best modes for carrying out the invention have been described in detail, those familiar with the art to which this invention relates will recognize various alternative designs and embodiments for practicing the invention within the scope of the appended claims.

The invention claimed is:

1. A convertible vehicle (1) with a roof (2), which includes, in the closed state, a section (6) of a transversely running roof strut (6a) on an area directly or indirectly adjacent to the windshield frame (4) that protrudes farther into the passenger compartment (7) than roof areas lying behind it, characterized in that the section (6), on a surface (11) facing the passenger compartment (7) has at least one large-area recess (9, 10), coverable by at least one deformable covering (14, 15);

wherein the deformable covering can deform upon impact with a vehicle occupant without injuring the vehicle occupant.

2. A convertible vehicle (1) according to claim 1, characterized in that the covering (14, 15) includes a surface of at least 70 square centimeters facing the passenger compartment (7).

3. A convertible vehicle (1) according to claim 1, characterized in that two coverable recesses (9; 10) are present, symmetric to a vertical longitudinal center plane (8) of the vehicle.

4. A convertible vehicle (1) according claim 1, characterized in that a solder line (19; 20) on the outer surface of the at least one covering (14; 15) includes a rearward facing component, at least over a partial area, and a downward facing component over a partial area.

5. A convertible vehicle (1) according to claim 1, characterized in that the at least one recess (9, 10) is at least twenty-five centimeters wide and ten centimeters deep.

6. A convertible vehicle (1) according to claim 1, characterized in that the at least one covering (14, 15), in the calculated head impact area of the driver and/or passenger during a possible front collision, lie on the section (6) protruding into the passenger compartment (7).

7. A convertible vehicle (1) according to claim 1, characterized in that parts for locking the roof strut (6a) to the windshield frame (4) can be mounted through the open recesses (9; 10).

8. A convertible vehicle (1) according to claim 1, characterized in that the at least one covering (14, 15) with an end arranged in the front in the direction of travel (F) that lies on the windshield frame (4) when the roof (2) is closed, is screwed to the roof strut (6a).

9. A convertible vehicle (1) according to claim 1, characterized in that the at least one covering (14, 15) is releasably suspendable on a rear end opposite the direction of travel (F) behind at least one protrusion (17) of the roof struts (6a).

10. A convertible vehicle (1) according to claim 9, characterized in that the protrusion (17) is a hold-down (18) for the covering (14; 15) that prevents it from being forced up.

11. A convertible vehicle (1) according to claim 7, wherein the parts for locking the roof strut (6a) to the windshield frame are safety catches (12).

12. A movable vehicle roof (2) for a convertible vehicle (1) according to claim 1.

13. A convertible vehicle (1) with a roof (2), which includes, in the closed state, a section (6) of a transversely running roof strut (6a) on an area directly or indirectly adjacent to the windshield frame (4) that protrudes farther into the passenger compartment (7) than roof areas lying behind it, characterized in that the section (6), on a surface (11) facing the passenger compartment (7) has at least one large-area recess (9, 10), coverable by at least one deformable covering (14, 15);

wherein a solder line (19; 20) on the outer surface of the at least one covering (14; 15) includes a rearward facing component, at least over a partial area, and a downward facing component over a partial area.

14. A convertible vehicle (1) according to claim 13, characterized in that the covering (14, 15) includes a surface of at least 70 square centimeters facing the passenger compartment (7).

15. A convertible vehicle (1) according to claim 13, characterized in that two coverable recesses (9; 10) are present, symmetric to a vertical longitudinal center plane (8) of the vehicle.

16. A convertible vehicle (1) according to claim 13, characterized in that the at least one covering (14, 15), in the calculated head impact area of the driver and/or passenger during a possible front collision, lie on the section (6) protruding into the passenger compartment (7).

17. A convertible vehicle (1) according to claim 13, characterized in that parts for locking the roof strut (6a) to the windshield frame (4) can be mounted through the open recesses (9; 10).

18. A convertible vehicle (1) according to claim 13, characterized in that the at least one covering (14, 15) with an end arranged in the front in the direction of travel (F) that lies on the windshield frame (4) when the roof (2) is closed, is screwed to the roof strut (6a).

19. A convertible vehicle (1) with a roof (2), which includes, in the closed state, a section (6) of a transversely running roof strut (6a) on an area directly or indirectly adjacent to the windshield frame (4) that protrudes farther into the passenger compartment (7) than roof areas lying behind it,
characterized in that the section (6), on a surface (11) facing the passenger compartment (7) has at least one large-area recess (9, 10), coverable by at least one deformable covering (14, 15);
wherein the at least one covering (14, 15) is releasably suspendable on a rear end opposite the direction of travel (F) behind at least one protrusion (17) of the roof struts (6a).

20. A convertible vehicle (1) according to claim 19, characterized in that the protrusion (17) is a hold-down (18) for the covering (14; 15) that prevents it from being forced up.

\* \* \* \* \*